(12) United States Patent
Woodall et al.

(10) Patent No.: US 10,013,976 B2
(45) Date of Patent: Jul. 3, 2018

(54) CONTEXT SENSITIVE OVERLAYS IN VOICE CONTROLLED HEADSET COMPUTER DISPLAYS

(71) Applicant: Kopin Corporation, Taunton, MA (US)

(72) Inventors: James Woodall, Nottingham (GB); Christopher Parkinson, Richland, WA (US)

(73) Assignee: Kopin Corporation, Westborough, MA (US)

(*) Notice: Subject to any disclaimer, the term of this patent is extended or adjusted under 35 U.S.C. 154(b) by 8 days.

(21) Appl. No.: 13/799,790

(22) Filed: Mar. 13, 2013

(65) Prior Publication Data

US 2013/0231937 A1 Sep. 5, 2013

Related U.S. Application Data

(63) Continuation-in-part of application No. 13/234,916, filed on Sep. 16, 2011, now Pat. No. 9,122,307, and
(Continued)

(51) Int. Cl.
*G09G 5/22* (2006.01)
*G10L 15/22* (2006.01)
(Continued)

(52) U.S. Cl.
CPC .............. *G10L 15/22* (2013.01); *G06F 3/011* (2013.01); *G06F 3/012* (2013.01); *G06F 3/013* (2013.01); *G06F 3/017* (2013.01); *G06F 3/167* (2013.01)

(58) Field of Classification Search
CPC .................................. G06F 3/167; G06F 3/013
See application file for complete search history.

(56) References Cited

U.S. PATENT DOCUMENTS

| 4,567,479 A | 1/1986 | Boyd |
| 5,005,213 A | 4/1991 | Hanson et al. |

(Continued)

FOREIGN PATENT DOCUMENTS

| CN | 1735019 A | 2/2006 |
| CN | 1797299 A | 7/2006 |

(Continued)

OTHER PUBLICATIONS

International Search Report and Written Opinion of PCT/US2011/052164 dated Jan. 17, 2012.
(Continued)

*Primary Examiner* — Phi Hoang
(74) *Attorney, Agent, or Firm* — Hamilton, Brook, Smith & Reynolds, P.C.

(57) ABSTRACT

In headset computers that leverage voice commands, often the user does not know what voice commands are available. In one embodiment, a method includes providing a user interface in a headset computer and, in response to user utterance of a cue toggle command, displaying at least one cue in the user interface. Each cue can correspond to a voice command associated with code to execute. In response to user utterance of the voice command, the method can also include executing the code associated with the voice command. The user can therefore ascertain what voice commands are available.

20 Claims, 8 Drawing Sheets

Related U.S. Application Data a continuation-in-part of application No. 13/799,888, filed on Mar. 13, 2013, now Pat. No. 9,377,862.

(60) Provisional application No. 61/749,240, filed on Jan. 4, 2013, provisional application No. 61/384,586, filed on Sep. 20, 2010, provisional application No. 61/653,127, filed on May 30, 2012.

(51) Int. Cl.
*G06F 3/01* (2006.01)
*G06F 3/16* (2006.01)

(56) References Cited

U.S. PATENT DOCUMENTS

| | | |
|---|---|---|
| 5,208,449 A | 5/1993 | Eastman |
| 5,594,469 A | 1/1997 | Freeman et al. |
| 5,689,619 A | 11/1997 | Smyth |
| 5,698,834 A | 12/1997 | Worthington |
| 5,742,263 A | 4/1998 | Wang |
| 5,818,455 A | 10/1998 | Stone |
| 5,990,793 A | 11/1999 | Beiback |
| 6,010,216 A | 1/2000 | Jesiek |
| 6,084,556 A | 7/2000 | Zwern |
| 6,108,197 A | 8/2000 | Janik |
| 6,192,343 B1 * | 2/2001 | Morgan .............. G06F 9/4446 704/231 |
| 6,198,462 B1 | 3/2001 | Daily et al. |
| 6,204,974 B1 | 3/2001 | Spitzer |
| 6,313,864 B1 | 11/2001 | Tabata et al. |
| 6,325,507 B1 | 12/2001 | Jannard et al. |
| 6,369,952 B1 | 4/2002 | Rallison et al. |
| 6,408,257 B1 | 6/2002 | Harrington et al. |
| 6,532,446 B1 | 3/2003 | King |
| 6,538,676 B1 | 3/2003 | Peters et al. |
| 6,678,906 B1 | 8/2004 | Hennings et al. |
| 6,778,906 B1 | 8/2004 | Hennings et al. |
| 6,798,391 B2 | 9/2004 | Petersen, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,965,862 B2 | 11/2005 | Schuller |
| 6,966,647 B2 | 11/2005 | Jannard et al. |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,501,995 B2 | 3/2009 | Morita et al. |
| 7,512,414 B2 | 3/2009 | Jannard et al. |
| 7,620,432 B2 | 11/2009 | Williams et al. |
| 7,620,433 B2 | 11/2009 | Bodylet |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard et al. |
| 7,997,723 B2 | 8/2011 | Pienimaa et al. |
| 8,010,156 B2 | 8/2011 | Warren |
| 8,020,989 B2 | 9/2011 | Jannard et al. |
| 8,025,398 B2 | 9/2011 | Jannard |
| 8,072,393 B2 | 12/2011 | Riechel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,108,143 B1 | 5/2012 | Tester |
| 8,170,262 B1 | 5/2012 | Liu |
| 8,184,983 B1 | 5/2012 | Ho et al. |
| 8,212,859 B2 | 7/2012 | Tang et al. |
| 8,327,295 B2 | 12/2012 | Ikeda |
| 8,577,427 B2 | 11/2013 | Serota |
| 8,838,075 B2 | 9/2014 | Basir |
| 8,855,719 B2 | 10/2014 | Jacobsen et al. |
| 8,862,186 B2 | 10/2014 | Jacobsen et al. |
| 8,885,719 B2 | 11/2014 | Kondo et al. |
| 8,929,954 B2 | 1/2015 | Jacobsen et al. |
| 9,118,875 B2 * | 8/2015 | Ida .......................... H04N 5/64 |
| 9,122,307 B2 | 9/2015 | Jacobsen et al. |
| 9,235,262 B2 | 1/2016 | Jacobsen et al. |
| 9,294,607 B2 | 3/2016 | Jacobsen et al. |
| 9,301,085 B2 | 3/2016 | Parkinson et al. |
| 9,316,827 B2 | 4/2016 | Lindley et al. |
| 9,369,760 B2 | 6/2016 | Jacobsen et al. |
| 9,507,772 B2 | 11/2016 | Parkinson et al. |
| 9,817,232 B2 | 11/2017 | Lindley et al. |
| 2001/0003712 A1 | 6/2001 | Roelofs |
| 2001/0035845 A1 | 11/2001 | Zwern |
| 2002/0015008 A1 | 2/2002 | Kishida |
| 2002/0030649 A1 | 3/2002 | Zavracky et al. |
| 2002/0044152 A1 | 4/2002 | Abbott, III et al. |
| 2002/0065115 A1 | 5/2002 | Lindholm |
| 2002/0094845 A1 | 7/2002 | Inasaka |
| 2002/0154070 A1 | 10/2002 | Sato et al. |
| 2002/0158815 A1 | 10/2002 | Zwern |
| 2003/0016253 A1 | 1/2003 | Aoki et al. |
| 2003/0046401 A1 * | 3/2003 | Abbott ............... G06F 9/4443 709/228 |
| 2003/0065805 A1 * | 4/2003 | Barnes, Jr. ................. 709/231 |
| 2003/0067536 A1 | 4/2003 | Boulanger et al. |
| 2003/0068057 A1 | 4/2003 | Miller et al. |
| 2003/0222917 A1 | 12/2003 | Trantow |
| 2004/0102967 A1 | 5/2004 | Levin |
| 2004/0113867 A1 | 6/2004 | Tomine et al. |
| 2004/0193413 A1 | 9/2004 | Wilson et al. |
| 2004/0210852 A1 | 10/2004 | Balakrishnan et al. |
| 2004/0267527 A1 | 12/2004 | Creamer et al. |
| 2005/0047629 A1 | 3/2005 | Farrell et al. |
| 2005/0108643 A1 | 5/2005 | Schybergson et al. |
| 2005/0114140 A1 * | 5/2005 | Brackett et al. ............. 704/270 |
| 2005/0237296 A1 | 10/2005 | Lee |
| 2005/0245292 A1 | 11/2005 | Bennett et al. |
| 2005/0261890 A1 | 11/2005 | Robinson |
| 2005/0264527 A1 | 12/2005 | Lindholm |
| 2006/0010368 A1 | 1/2006 | Kashi |
| 2006/0028400 A1 | 2/2006 | Lapstun et al. |
| 2006/0061551 A1 | 3/2006 | Fateh |
| 2006/0074624 A1 | 4/2006 | Sahashi |
| 2006/0109237 A1 | 5/2006 | Morita et al. |
| 2006/0132382 A1 | 6/2006 | Jannard |
| 2006/0166705 A1 | 7/2006 | Seshadri et al. |
| 2006/0178085 A1 | 8/2006 | Sotereanos et al. |
| 2006/0221266 A1 | 10/2006 | Kato et al. |
| 2006/0238877 A1 | 10/2006 | Ashkenazi et al. |
| 2007/0009125 A1 | 1/2007 | Frerking et al. |
| 2007/0030174 A1 | 2/2007 | Randazzo et al. |
| 2007/0053544 A1 | 3/2007 | Jhao et al. |
| 2007/0093279 A1 | 4/2007 | Janik |
| 2007/0103388 A1 | 5/2007 | Spitzer |
| 2007/0180979 A1 | 8/2007 | Rosenberg |

(56) References Cited

U.S. PATENT DOCUMENTS

| | | |
|---|---|---|
| 2007/0220108 A1 | 9/2007 | Whitaker |
| 2007/0238475 A1 | 10/2007 | Goedken |
| 2007/0265495 A1 | 11/2007 | Vayser |
| 2008/0052643 A1 | 2/2008 | Ike et al. |
| 2008/0055194 A1 | 3/2008 | Baudino et al. |
| 2008/0084992 A1 | 4/2008 | Peddireddy et al. |
| 2008/0120141 A1* | 5/2008 | Kariathungal et al. ........... 705/3 |
| 2008/0144854 A1 | 6/2008 | Abreu |
| 2008/0180640 A1 | 7/2008 | Ito |
| 2008/0198324 A1 | 8/2008 | Fuziak |
| 2008/0200774 A1 | 8/2008 | Luo |
| 2008/0201634 A1 | 8/2008 | Gibb et al. |
| 2008/0211768 A1 | 9/2008 | Breen et al. |
| 2008/0239080 A1 | 10/2008 | Moscato |
| 2009/0002640 A1 | 1/2009 | Yang et al. |
| 2009/0079839 A1 | 3/2009 | Fischer et al. |
| 2009/0093304 A1 | 4/2009 | Ohta |
| 2009/0099836 A1 | 4/2009 | Jacobsen et al. |
| 2009/0117890 A1 | 5/2009 | Jacobsen et al. |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2009/0182562 A1* | 7/2009 | Caire ............... G01C 21/3608 704/275 |
| 2009/0204410 A1 | 8/2009 | Mozer et al. |
| 2009/0213071 A1 | 8/2009 | Wang et al. |
| 2009/0240488 A1 | 9/2009 | White |
| 2009/0251409 A1 | 10/2009 | Parkinson et al. |
| 2010/0001699 A1 | 1/2010 | Dragojevic |
| 2010/0020229 A1 | 1/2010 | Hershey et al. |
| 2010/0033830 A1 | 2/2010 | Yung |
| 2010/0041447 A1 | 2/2010 | Graylin |
| 2010/0053069 A1 | 3/2010 | Tricoukes et al. |
| 2010/0073201 A1 | 3/2010 | Holcomb et al. |
| 2010/0106497 A1 | 4/2010 | Phillips |
| 2010/0117930 A1 | 5/2010 | Bacabara |
| 2010/0119052 A1 | 5/2010 | Kambli |
| 2010/0121480 A1 | 5/2010 | Stelzer et al. |
| 2010/0128626 A1 | 5/2010 | Anderson et al. |
| 2010/0141554 A1 | 6/2010 | Devereaux et al. |
| 2010/0156812 A1 | 6/2010 | Stallings et al. |
| 2010/0164990 A1 | 7/2010 | Van Doorn |
| 2010/0169073 A1 | 7/2010 | Almagro |
| 2010/0171680 A1 | 7/2010 | Lapidot et al. |
| 2010/0182137 A1 | 7/2010 | Pryor |
| 2010/0204981 A1 | 8/2010 | Ribeiro |
| 2010/0225734 A1 | 9/2010 | Weller et al. |
| 2010/0235161 A1 | 9/2010 | Kim et al. |
| 2010/0238184 A1 | 9/2010 | Janicki |
| 2010/0245585 A1 | 9/2010 | Fisher et al. |
| 2010/0250231 A1 | 9/2010 | Almagro |
| 2010/0309295 A1 | 9/2010 | Chow |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2010/0302137 A1 | 12/2010 | Benko et al. |
| 2010/0306711 A1 | 12/2010 | Kahn et al. |
| 2011/0001699 A1 | 1/2011 | Jacobsen et al. |
| 2011/0089207 A1 | 4/2011 | Tricoukes et al. |
| 2011/0090135 A1 | 4/2011 | Tricoukes et al. |
| 2011/0092825 A1 | 4/2011 | Gopinathan et al. |
| 2011/0134910 A1 | 6/2011 | Chao-Suren et al. |
| 2011/0187640 A1 | 8/2011 | Jacobsen et al. |
| 2011/0214082 A1 | 9/2011 | Osterhout et al. |
| 2011/0221656 A1 | 9/2011 | Haddick et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0238405 A1 | 9/2011 | Pedre |
| 2011/0248904 A1 | 10/2011 | Miyawaki |
| 2011/0254698 A1 | 10/2011 | Eberl et al. |
| 2011/0254865 A1 | 10/2011 | Yee et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056846 A1 | 3/2012 | Zaliva |
| 2012/0062445 A1 | 3/2012 | Haddick et al. |
| 2012/0068914 A1 | 3/2012 | Jacobsen |
| 2012/0075177 A1 | 3/2012 | Jacobsen et al. |
| 2012/0089392 A1* | 4/2012 | Larco et al. ................. 704/231 |
| 2012/0105740 A1 | 5/2012 | Jannard et al. |
| 2012/0110456 A1 | 5/2012 | Larco et al. |
| 2012/0114131 A1 | 5/2012 | Tricoukes et al. |
| 2012/0166203 A1 | 6/2012 | Fuchs et al. |
| 2012/0088245 A1 | 7/2012 | Rotter et al. |
| 2012/0173100 A1 | 7/2012 | Ellis |
| 2012/0188245 A1 | 7/2012 | Hyatt |
| 2012/0236025 A1 | 9/2012 | Jacobsen et al. |
| 2012/0287284 A1 | 11/2012 | Jacobsen et al. |
| 2012/0302288 A1 | 11/2012 | Born et al. |
| 2013/0070930 A1 | 3/2013 | Johnson |
| 2013/0174205 A1 | 7/2013 | Jacobsen et al. |
| 2013/0231937 A1 | 9/2013 | Woodall et al. |
| 2013/0239000 A1 | 9/2013 | Parkinson |
| 2013/0274985 A1 | 10/2013 | Lee et al. |
| 2013/0288753 A1 | 10/2013 | Jacobsen et al. |
| 2013/0289971 A1 | 10/2013 | Parkinson |
| 2013/0300649 A1 | 11/2013 | Parkinson et al. |
| 2014/0003616 A1 | 1/2014 | Johnson et al. |
| 2014/0059263 A1 | 2/2014 | Rosenberg et al. |
| 2014/0093103 A1 | 4/2014 | Breece et al. |
| 2014/0111427 A1 | 4/2014 | Lindley et al. |
| 2014/0223299 A1 | 8/2014 | Han |
| 2014/0235169 A1 | 8/2014 | Parkinson et al. |
| 2014/0334644 A1 | 11/2014 | Selig |
| 2014/0368412 A1 | 12/2014 | Jacobsen et al. |
| 2015/0039311 A1 | 2/2015 | Clark et al. |
| 2015/0072672 A1 | 3/2015 | Jacobsen et al. |
| 2015/0279354 A1 | 10/2015 | Gruenstein |
| 2015/0346489 A1 | 12/2015 | Lindley et al. |

FOREIGN PATENT DOCUMENTS

| | | |
|---|---|---|
| CN | 101196793 A | 6/2008 |
| CN | 101243392 | 8/2008 |
| CN | 101349944 A | 1/2009 |
| CN | 101444087 A | 5/2009 |
| CN | 101581969 A | 11/2009 |
| CN | 101599267 A | 12/2009 |
| CN | 101620511 A | 1/2010 |
| CN | 101755299 A | 6/2010 |
| CN | 102541438 A | 7/2012 |
| CN | 102812417 A | 12/2012 |
| DE | 103 44 062 | 4/2005 |
| EP | 2 207 164 | 7/2010 |
| JP | 09-034895 A | 2/1997 |
| JP | 10-020867 A | 1/1998 |
| JP | 2001-100878 A | 4/2001 |
| JP | 2001-506389 A | 5/2001 |
| JP | 2001-202175 | 7/2001 |
| JP | 2001-216069 A | 8/2001 |
| JP | 2002-525769 A | 8/2002 |
| JP | 2003-241880 | 8/2003 |
| JP | 2003-241880 A | 8/2003 |
| JP | 2004-233117 | 8/2004 |
| JP | 2004-233117 A | 8/2004 |
| JP | 2005-012377 A | 1/2005 |
| JP | 2007-079978 A | 3/2007 |
| JP | 2007-213501 | 8/2007 |
| JP | 2008-052590 A | 3/2008 |
| JP | 2008-278536 | 11/2008 |
| JP | 2011-511935 A | 7/2009 |
| JP | 2009-179062 A | 8/2009 |
| JP | 2010-102163 | 5/2010 |
| JP | 2011-511935 | 4/2011 |
| JP | 2011-198150 | 10/2011 |
| JP | 2012-002568 | 1/2012 |
| JP | 2012-044429 | 3/2012 |
| JP | 2012-056568 | 3/2012 |
| JP | 2012-174149 | 9/2012 |
| WO | WO 1995/021408 | 8/1995 |
| WO | WO 1995/023994 | 9/1995 |

(56) References Cited

FOREIGN PATENT DOCUMENTS

| WO | WO 99/01838 | 1/1999 |
|---|---|---|
| WO | WO 00/17848 | 3/2000 |
| WO | WO 2000/079327 | 12/2000 |
| WO | WO 2005/017729 A2 | 2/2005 |
| WO | WO 2009/076016 | 6/2009 |
| WO | WO 2009/091639 | 7/2009 |
| WO | WO 2009/091639 A1 | 7/2009 |
| WO | WO 2009/120984 A1 | 10/2009 |
| WO | WO 2010/019634 A | 2/2010 |
| WO | WO 2010/129679 A1 | 11/2010 |
| WO | WO 2011/051660 | 5/2011 |
| WO | WO 2011/097226 A1 | 8/2011 |
| WO | WO 2011/114149 A1 | 9/2011 |
| WO | WO 2012/040107 A1 | 3/2012 |
| WO | WO 2012/040386 | 3/2012 |
| WO | WO 2012/154938 A1 | 11/2012 |
| WO | WO 2013/101438 | 7/2013 |

OTHER PUBLICATIONS

International Preliminary Report on Patentability and Written Opinion, PCT/US2011/023337, dated Aug. 16, 2012, 8 pages.
Notification of Transmittal of International Search Report and Written Opinion of PCT/US2012/037284 dated Oct. 1, 2012.
Notification of Transmittal of International Search Report and Written Opinion of PCT/US2012/068686, dated Mar. 25, 2013, 11 pages.
Notification of Transmittal of the International Search Report and Written Opinion for PCT/US2013/078051, "Lifeboard-Series Of Home Pages For Head Mounted Displays (HMD) That Respond To Head Tracking", dated Apr. 22, 2014.
European Search Report for EP 12782481.1 dated Sep. 29, 2014.
Notification of Transmittal of the International Search Report and Written Opinion for PCT/US2013/041070 "Controlled Headset Computer Displays" dated Oct. 18, 2013.
Notification of Transmittal of The International Search Report and Written Opinion for PCT/US2013/041349 "Head-Worn Computer With Improved Virtual Display Function" dated Aug. 9, 2013.
EP 12782481.1 Supplemental European Search Report, "Context Sensitive Overlays In Voice Controlled Headset Computer Displays," dated Sep. 29, 2014.
International Search Report and Written Opinion for PCT/US2013/065927 dated Mar. 21, 2014, entitled, "Improved Headset Computer Operation Using Vehicle Sensor Feedback for Remote Control Vehicle".
Morphew, M.E., et al., "Helmet Mounted Displays for Unmanned Aerial Vehicle Control", Proceedings of SPIE, vol. 5442, Oct. 20, 2004.
Notification Concerning Transmittal of International Preliminary Report on Patentability of PCT/US2012/037284, "Headset Computer That Uses Motion And Voices To Control Information Display And Remote Devices", dated Nov. 21, 2013, 7 pages.
International Preliminary Report on Patentability for PCT/US2013/041070 dated Jul. 16, 2015; entitled "Context Sensitive Overlays In Voice Controlled Headset Computer Displays".
International Preliminary Report on Patentability for PCT/US2011/052164 dated Apr. 4, 2013; entitled "Advanced Remote Control Of Host Application Using Motion And Voice Commands".

* cited by examiner

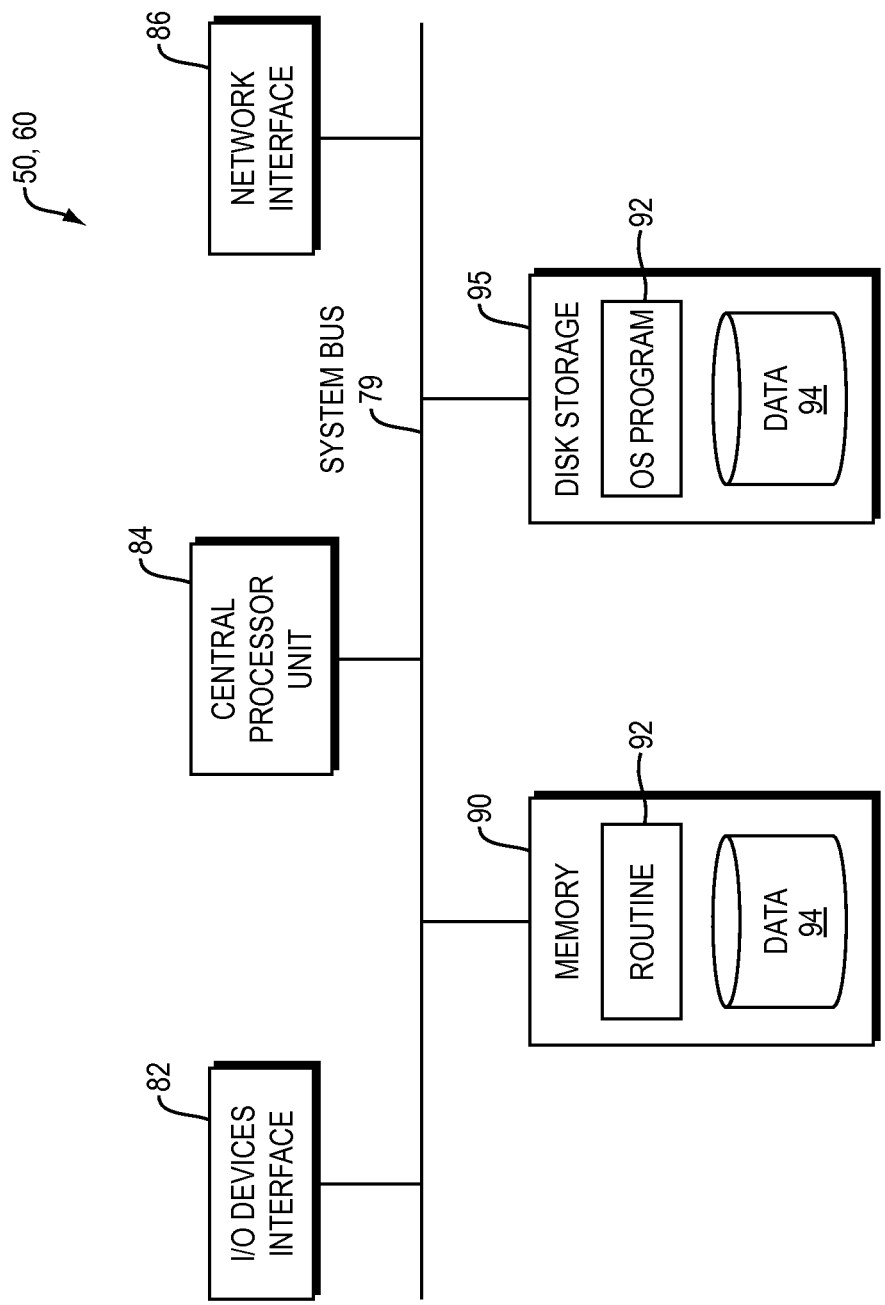

CONTEXT SENSITIVE OVERLAYS IN VOICE CONTROLLED HEADSET COMPUTER DISPLAYS

RELATED APPLICATIONS

This application claims the benefit of to U.S. Application No. 61/749,240 filed Jan. 4, 2013 and is a continuation-in-part of U.S. application Ser. No. 13/234,916 filed Sep. 16, 2011, which claims the benefit of 61/384,586 filed Sep. 20, 2010. The entire teachings of the above applications are incorporated herein by reference. This application also claims priority to and is a continuation-in-part of U.S. application Ser. No. 13/799,888, filed Mar. 13, 2013 which claims the benefit of U.S. Application No. 61/653,127, filed May 30, 2012.

BACKGROUND OF THE INVENTION

Mobile computing devices, such as notebook PCs, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free, high-quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to either eyeglasses, audio headset or video eyewear. A "wireless computing headset" device includes one or more small high-resolution micro-displays and optics to magnify the image. The WVGA microdisplay's can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility through hands dependent devices. For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

In one embodiment, a method includes providing a user interface in a headset computer and, in response to user utterance of a cue toggle command, displaying at least one cue in the user interface. Each cue can correspond to a voice command associated with code to execute. In response to user utterance of the voice command, the method can also include executing the code associated with the voice command.

In another embodiment, the method can further includes displaying the interface without the cue at least one of prior to the cue toggle command and after a subsequent cue toggle command. Displaying the cue can include displaying words that activate the voice command. Displaying the cue can also include displaying the cue in the user interface corresponding to the voice command associated with the control, where the control is displayed in the user interface. Displaying the cue can include displaying the cue in the user interface corresponding to the voice command associated with the control, where the control is hidden from the user interface. Displaying the cue can include displaying the cue in the user interface corresponding to the voice command associated with the control, where the control is a global headset control. The cue can be loaded from a control, the control indicating the cue and voice command.

In another embodiment, a system for displaying a user interface in a headset computer can include a display module configured to provide a user interface in a headset computer. The display module can be further configured to, in response to user utterance of a cue toggle command, display at least one cue in the user interface. Each cue can correspond to a voice command associated with code to execute. The system can further include a command module configured to, in response to user utterance of the voice command, execute code associated with the voice command.

In another embodiment, a method of developing a user interface in a headset computer includes embedding a cue and a voice command in a control for the user interface. The method also includes providing the control to the user interface, the user interface configured to display the cue responsive to a cue toggle command.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is a diagram of the internal structure of a computer (e.g., client processor/device or server computers) in the computer system of FIG. 6.

DETAILED DESCRIPTION OF THE INVENTION

Figure 1A:
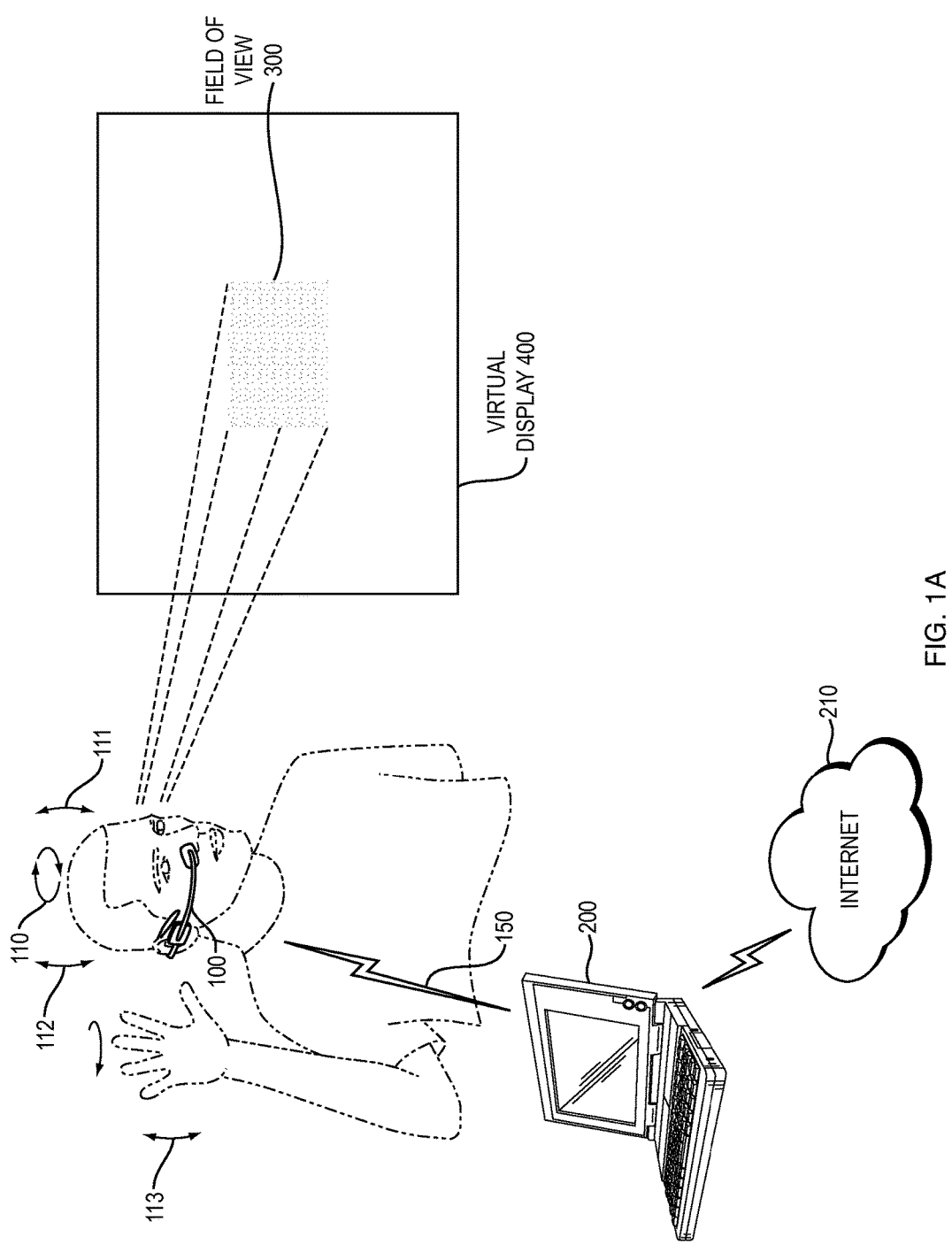
FIGS. 1A-1B are schematic illustrations of a headset computer cooperating with a host computer (e.g., Smart Phone, laptop, etc.) according to principles of the present invention.
Figure 1B:
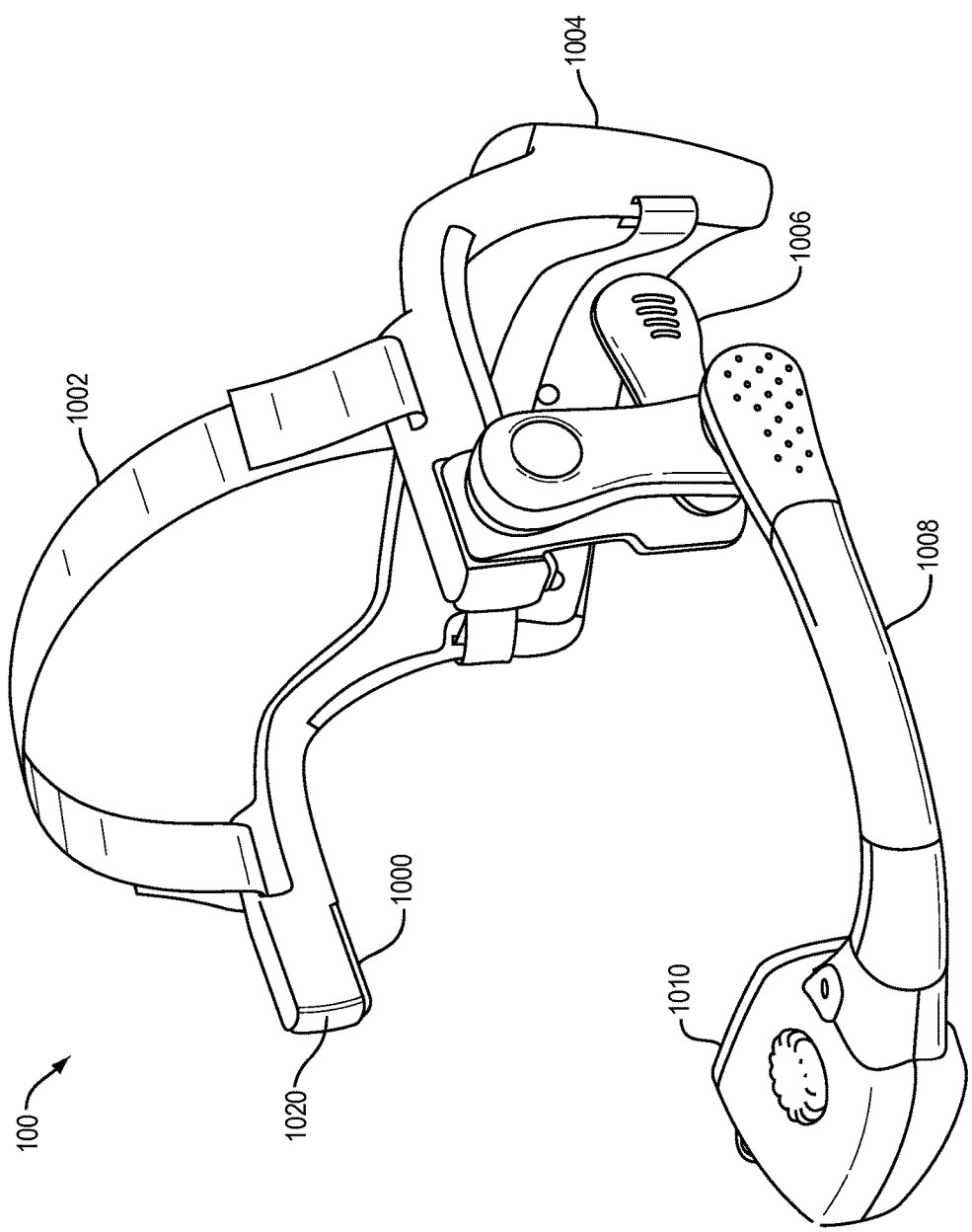

FIGS. 1A and 1B show an example embodiment of a wireless computing headset device 100 (also referred to herein as a headset computer (HSC)) that incorporates a high-resolution (VGA or better) microdisplay element 1010, and other features described below. The HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 1B). Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. Microphone(s) operatively coupled or preferably integrated into the HSC 100 can be used to capture speech commands which are then digitized and processed using automatic speech recognition techniques. Gyroscopes, accelerometers, and other micro-electromechanical system sensors can be integrated into the HSC 100 and used to track the user's head movement to provide user input commands. Cameras or other motion tracking sensors can be used to monitor a user's hand gestures for user input commands. Such a user interface overcomes the hands-dependant formats of other mobile devices.

The HSC 100 can be used in various ways. It can be used as a remote display for streaming video signals received from a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The host may be further connected to other networks 210, such as the Internet. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033.) In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Microdisplay subassembly 1010 is used to render visual information to the user. It is coupled to the arm 1008. The arm 1008 generally provides physical support such that the microdisplay subassembly is able to be positioned within the user's field of view 300 (FIG. 1A), preferably in front of the eye of the user or within its peripheral vision preferably slightly below or above the eye. Arm 1008 also provides the electrical or optical connections between the microdisplay subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIG. 1A is a monocular microdisplay presenting a single fixed display element supported on the face of the user with a cantilevered boom, it should be understood that other mechanical configurations for the remote control display device 100 are possible.

Figure 2:
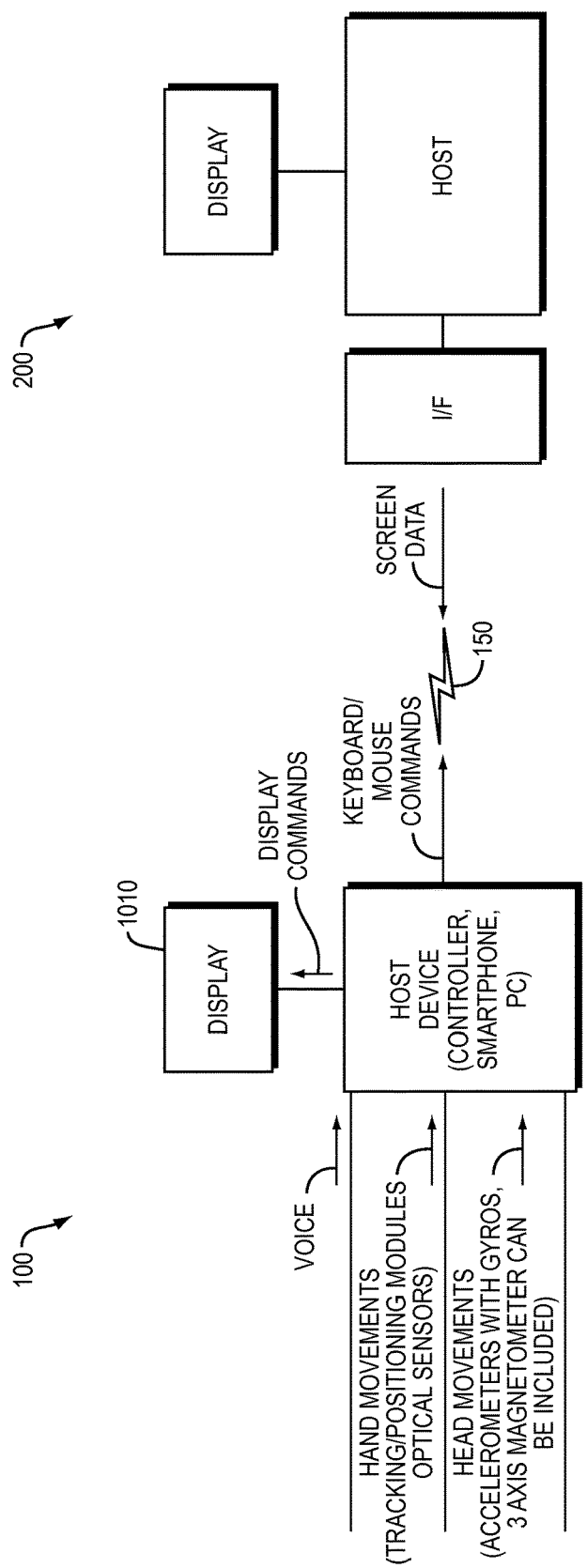
FIG. 2 is a block diagram of flow of data and control in the embodiment of FIGS. 1A-1B.

FIG. 2 is a block diagram showing more detail of the HSC device 100, host 200 and the data that travels between them. The HSC device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software in the HSC device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC device 100.

In one embodiment the HSC 100 may take the form of the HSC described in a co-pending U.S. Patent Publication No. 2011/0187640 which is hereby incorporated by reference in its entirety.

In another embodiment, the invention relates to the concept of using a Head Mounted Display (HMD) 1010 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small-simple instructions on how to lay out a screen, which text to display, and other stylistic information such as drawing arrows, or the background colours, images to include, etc.

Additional data could be streamed over the same 150 or another connection and displayed on screen 1010, such as a video stream if required by the Host 200.

This invention relates to the viewing of context sensitive overlays within applications, on voice controlled HSCs 100.

The concept is the presentation of data, contextually, over a visual, on demand. Overlays can be called up by the user with a voice command, typically "Show commands." The voice command is standard across the system 100 and available at all times. This command causes HSC 100 to display applicable voice commands and other information in a context sensitive and intuitive way.

The applicable commands are shown on a semi-transparent overlay of the current screen view of display unit 1010. This allows the user to retain the context of the screen he called the overlay up for.

The overlay and displayed applicable commands fade away after a short period of time. This is accomplished by a timing mechanism that refreshes the screen view.

The applicable commands are displayed in order of relevance. The most relevant command is given more prominence in terms of placement over less relevant commands. 100 determines relevancy based on the current context of the display 1010 contents.

Each screen in the relevant system is made up of user-interface (UI) components, some of which are 'controls'. A control is a UI component that provides information to the user or enables some form of functionality. Examples of controls are buttons, radio buttons, text boxes, check boxes, drop down menus, file menus, ribbon menus, live tiles, etc. Within the software developer's component library, these are available in their various forms, allowing customization of certain features. For example, one such control might be a 'button,' simply enabling the user to press it using a voice command available on the button. Controls, such as the 'button' control, are available to the developer, for example, as part of the developer's component library or other library. The developer can insert the pre-coded control and customize it to his or her liking, instead of manually coding the control from scratch.

A "Show Commands" function is built into the controls of the developer library. When the developer, for example, creates a button and specifies a text string to be written onto the button, the text string becomes the default voice command to activate the button, unless the developer (or user) overrides the voice command. The control (e.g., the button) is configured to react to a "show commands" voice command by overlaying the text string to activate the control over the control itself, or near the control.

Every User Interface screen made available on the HSC 100 has the ability to receive a "Show Commands" voice command (e.g., a system command, available by default). Therefore, when a screen is constructed using controls from the UI library, show commands functionality is built in, providing guidance as to the voice commands available to the user. These voice commands are (by default) shown in context of the current displayed contents (screen view).

Other available voice commands can also be placed within the show commands overlay that are not associated with a visible control. These are placed in the overlay by the developer, adding a voice-command only control, or adding a hidden control, and provide a visual cue for voice commands that are not associated with a button or other control.

Figure 3:
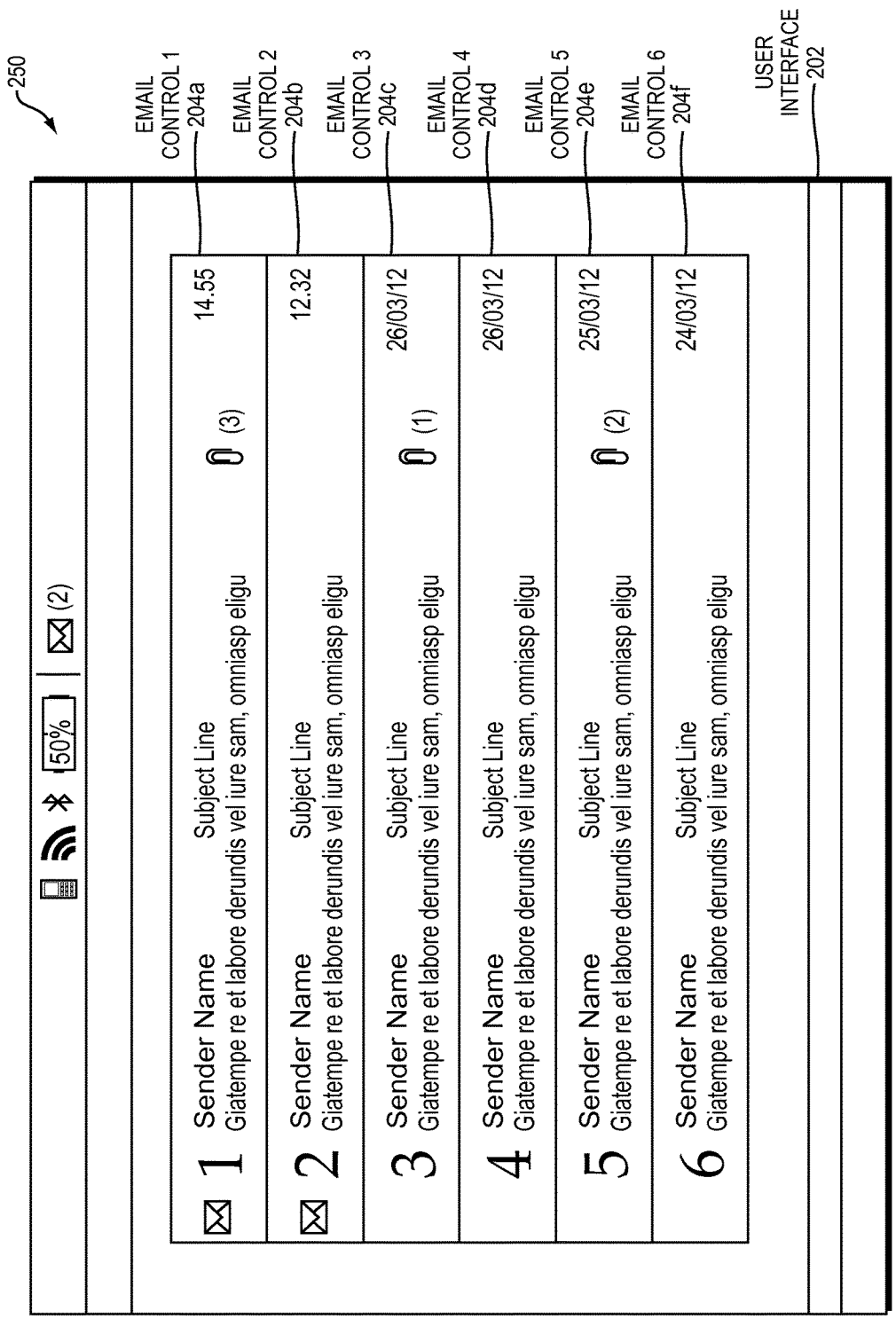
FIG. 3 is a diagram illustrating an example embodiment of a user interface employed in the HSC.

FIG. 3 is a diagram 250 illustrating an example embodiment of a user interface 202 employed in the HSC. The user interface 202, in this embodiment, is an email application displaying a user's inbox. Each email listing is a respective email control 1-6 204*a-f*. The user can open each email by selecting each control. Each email control 204*a-f* is programmed to be selected at least by a respective voice command.

Figure 4:
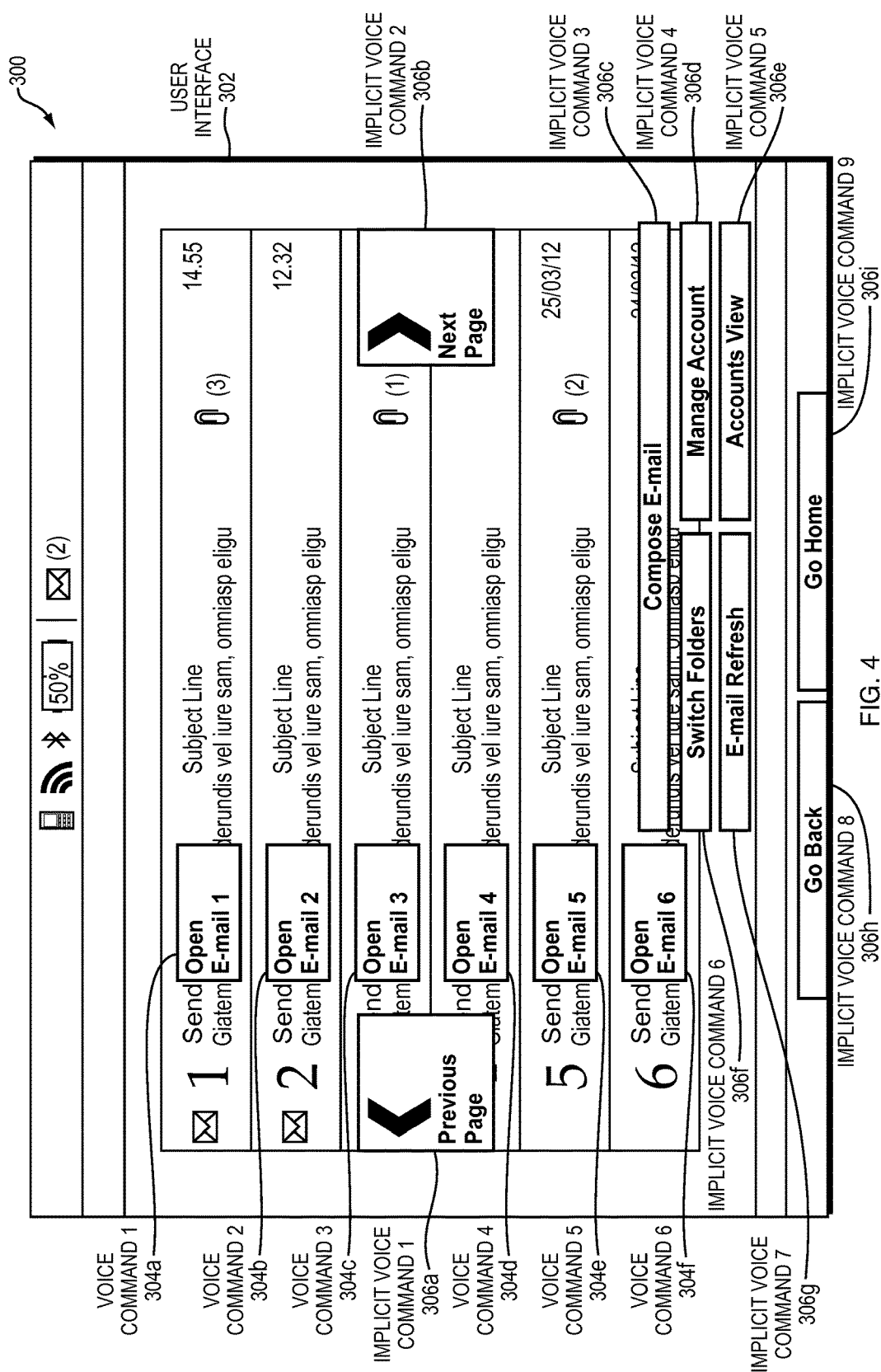
FIG. 4 is a diagram illustrating an example embodiment of a user interface after receiving a show commands voice command.

FIG. 4 is a diagram 300 illustrating an example embodiment of a user interface 302 after receiving a show commands voice command. The user interface displays voice commands corresponding to each of the email controls 204*a-f* of FIG. 2. With respect to FIG. 3, voice commands 1-6 304*a*-4 correspond with email controls 1-6 204*a-f*, respectively. For example, saying voice command 1 304*a* (i.e., "Open E-mail 1") causes the HSC to open the first email in the list.

The user interface 302 in show commands mode also shows a plurality of implicit voice commands 1-9 306*a-i*. The implicit voice commands 1-9 306*a-i* do not correspond to any particular visual control of the user interface, they are voice commands that are available to the user. For example, the user can say implicit voice commands 1 and 2 306*a-b* to move to the previous and next page, respectively. The user can draft an email by saying implicit command 3 306*c*. The user can manage his or her email account by saying implicit command 4 306*d*. The user can see his or her accounts by saying implicit command 5 306*e*. The user can switch folders by saying implicit voice command 6 306*f*. The user can refresh the inbox by saying implicit voice command 7 306*g*.

Further, the user can go back to a previous screen by saying implicit voice command 8 306*h*. The user can return to a home screen by saying implicit voice command 9 306*i*. Implicit voice commands 8 and 9 can be universal to all screens on the HSC. Voice commands 1-6 304*a-f* and implicit voice commands 1-7 306*a-g* are local commands for this particular application. However, in other embodiments, implicit voice commands 1-2 306*a-b* can be global commands for moving to previous and next pages of applications.

The voice command overlay aids the user by de-cluttering the screen of options and buttons. The voice commands further help prompt the user to how to use the system, which is especially useful while the user is learning how to use the device and voice commands.

Figure 5:
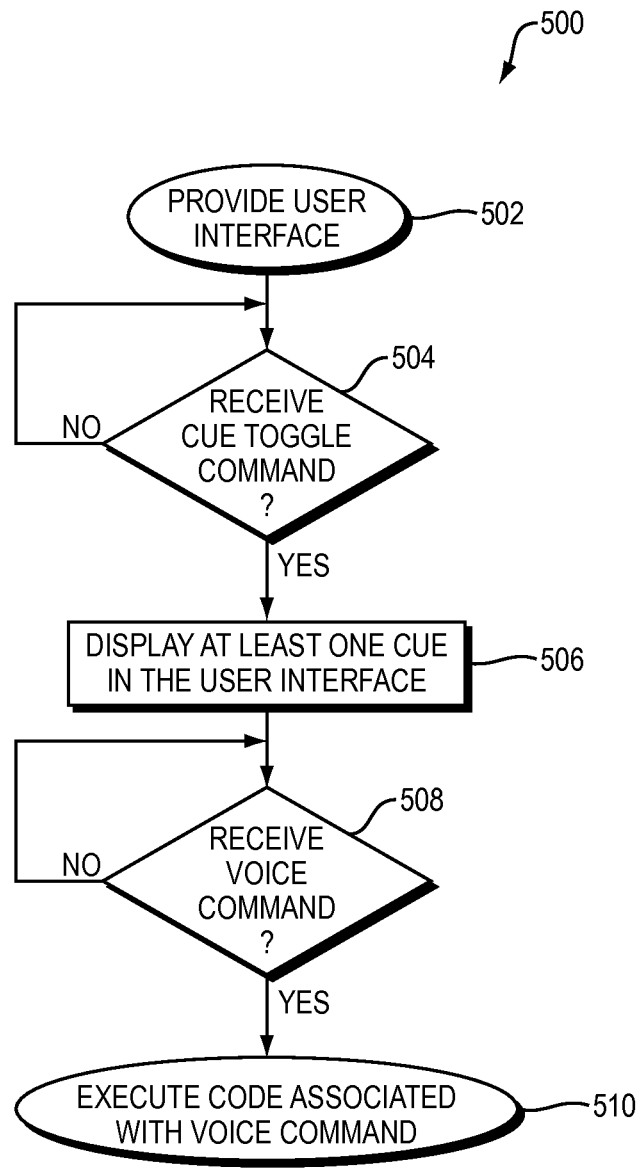
FIG. 5 is a flow diagram illustrating an example embodiment of a method employed by the present invention.

FIG. 5 is a flow diagram 500 illustrating an example embodiment of a method employed by the present invention. First, the method provides a user interface in a headset computer (502). Then, the method determines whether it has received a cue toggle command, for example, over an audio channel from a user utterance (504). If not, the method continues listening for the cue toggle command (504). If so, however, the method then displays at least one cue in the user interface (506). Each cue is associated with a corresponding voice command, which, when uttered, causes the system to execute code.

The system then determines whether it has received a voice command (e.g., a voice command shown by one of the cues) (508). If not, it keeps listening for a voice command (508). If so, however, it executes the code associated with the voice command (510).

Figure 6:
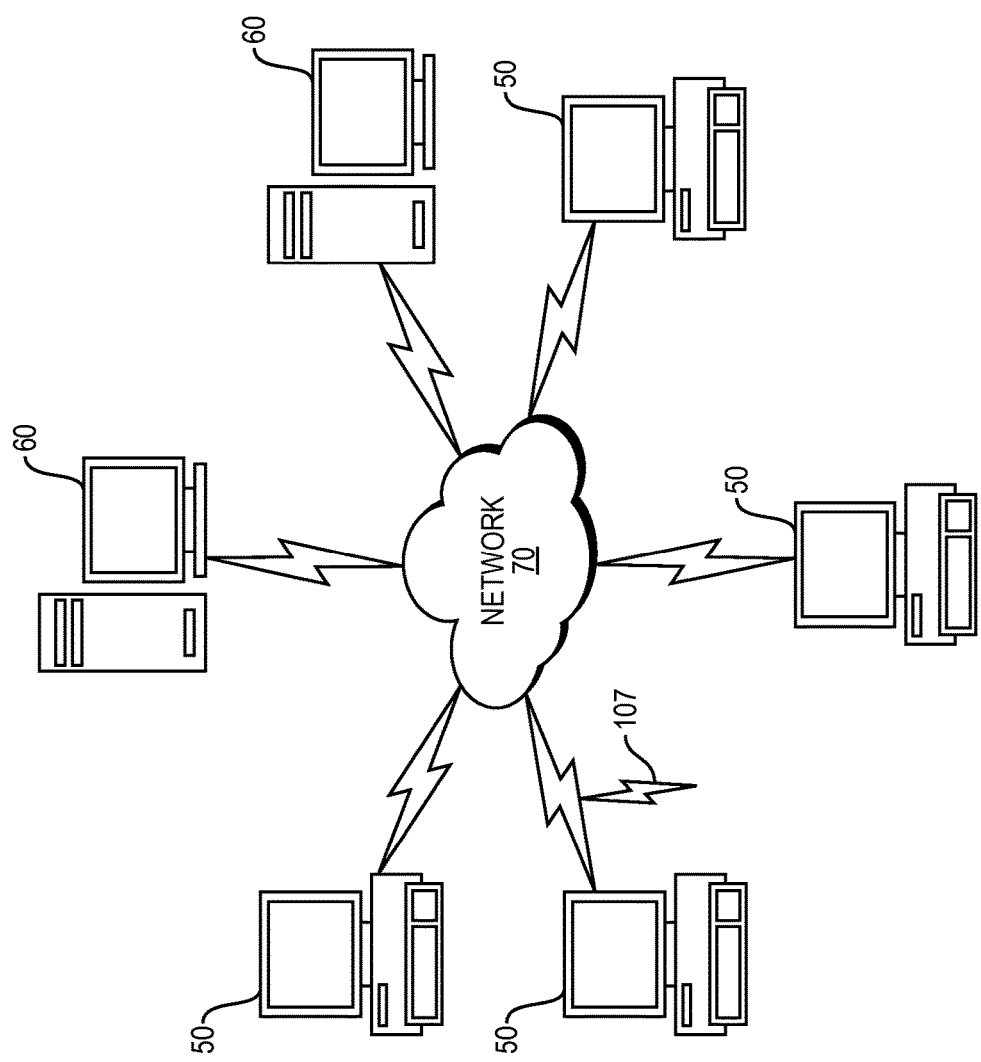
FIG. 6 illustrates a computer network or similar digital processing environment in which the present invention may be implemented.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., context sensitive overlays in a user interface code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

The invention claimed is:

1. A method comprising:
providing a graphical user interface having a plurality of controls to a headset computer from a host device;
displaying the provided graphical user interface on a microdisplay of the headset computer;
in response to user utterance of a cue toggle command, displaying on the provided graphical user interface a semi-transparent overlay of a screen view and displaying a plurality of cues within the semi-transparent overlay, each cue associated with a corresponding one of the plurality of controls and located proximate to its corresponding one of the plurality of controls, each cue further providing a voice command associated with code to execute the associated one of the plurality of controls, the semi-transparent overlay generated at a local processor of the headset computer and fading away after a period of time via a timing mechanism employed to refresh the screen view, the cue toggle command available at all times; and
in response to user utterance of the voice command, executing the code associated with the voice command.

2. The method of claim 1, wherein displaying the cue includes displaying words that activate the voice command.

3. The method of claim 1, wherein displaying the cue includes displaying the cue in the graphical user interface providing the voice command associated with the control, the control displayed in the graphical user interface.

4. The method of claim 1, wherein displaying the cue includes displaying the cue in the graphical user interface providing the voice command associated with the control, the control hidden from the graphical user interface.

5. The method of claim 1, wherein displaying the cue includes displaying the cue in the graphical user interface providing the voice command associated with the control, the control being a global headset control.

6. The method of claim 1, wherein the cue is loaded from a control, the control indicating the cue and voice command.

7. The method of claim 1, wherein each of the plurality of cues is displayed in order of relevance.

8. A system for displaying a user interface in a headset computer, the system comprising:
a processor local to the headset computer; and
a memory with computer code instructions stored thereon, the processor and the memory, with the computer code instructions being configured to cause the system to:
receive a graphical user interface having a plurality of controls from a host device;

display, via a microdisplay of the headset computer, the provided graphical user interface;

in response to user utterance of a cue toggle command, displaying on the provided graphical user interface a semi-transparent overlay of a screen view and displaying a plurality of cues within the semi-transparent overlay, each cue associated with a corresponding one of the plurality of controls and located proximate to its corresponding one of the plurality of controls, each cue further providing to a voice command associated with code to execute the associated one of the plurality of controls, in the graphical user interface, the semi-transparent overlay generated at the local processor of the headset computer and configured to fade away after a period of time via a timing mechanism employed to refresh the screen view, the cue toggle command available at all times; and in response to user utterance of the voice command, execute code associated with the voice command.

9. The system of claim 8, wherein displaying the semi-transparent overlay further displays words that activate the voice command.

10. The system of claim 8, wherein displaying the semi-transparent overlay further displays a cue includes displaying a cue in the graphical user interface providing a voice command associated with the control, the control displayed in the graphical user interface.

11. The system of claim 8, wherein displaying the semi-transparent overlay further displays the cue in the graphical user interface providing the voice command associated with the control, the control hidden from the graphical user interface.

12. The system of claim 8, wherein displaying the semi-transparent overlay further displays the cue in the graphical user interface providing the voice command associated with the control, the control being a global headset control.

13. The system of claim 8, wherein the cue is loaded from a control, the control indicating the cue and voice command.

14. The system of claim 8, wherein each of the plurality of cues is displayed in order of relevance.

15. A method of developing a graphical user interface in a headset computer, the method comprising:

embedding a voice command in a control for the graphical user interface, the voice command associated with the control;

providing the graphical user interface with the control to a headset computer from a host device; and displaying a semi-transparent overlay on the graphical user interface, the semi-transparent overlay including a cue providing the voice command, the cue located proximate to its corresponding one of the plurality of controls, wherein the displaying of the semi-transparent overlay is responsive to a cue toggle command and generated at a local processor of the headset computer, the semi-transparent overlay fading away after a period of time via a timing mechanism employed to refresh the screen view, the cue toggle command available at all times.

16. The method of claim 15, wherein the cue includes words that activate the voice command.

17. The method of claim 15, wherein the cue provides the voice command associated with the control displayed in the graphical user interface.

18. The method of claim 15, wherein the cue provides the voice command associated with the control hidden from the graphical user interface.

19. The method of claim 15, wherein the cue provides the voice command associated with the control being a global headset control.

20. The method of claim 15, wherein the cue is loaded from a control, the control indicating the cue and voice command.

* * * * *